March 4, 1930.   J. C. KOERBER   1,749,384
TRUCK FOR TOY VEHICLES
Filed April 28, 1928
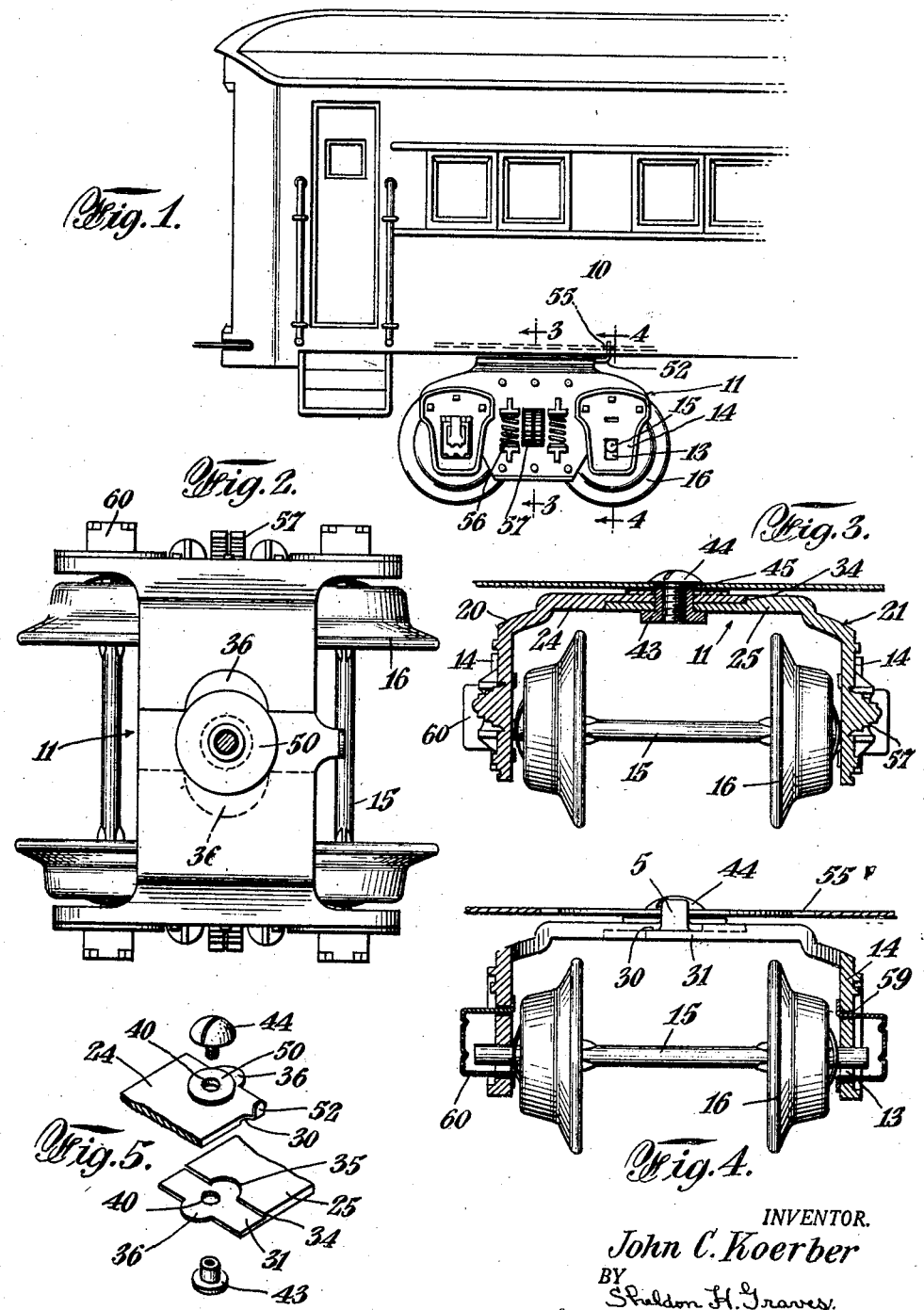
INVENTOR.
John C. Koerber
BY
Sheldon H. Graves.
ATTORNEY Patented Mar. 4, 1930

1,749,384

UNITED STATES PATENT OFFICE

JOHN C. KOERBER, OF SOUTH ORANGE, NEW JERSEY

TRUCK FOR TOY VEHICLES

Application filed April 28, 1928. Serial No. 273,460.

This invention relates to toy vehicles and particularly to trucks for toy railway cars.

Toy railway car trucks at present in use are usually formed of sides in which car axles are supported and a member joining the sides and extending under and pivotally secured to the bottom of the car body. The axles which carry the car wheels extend at their outer ends into the sides of the truck and in order to permit these axles to be inserted into the opening from between the sides of the truck it is customary to make the truck in whole or in part of thin sheet metal to allow the sides to be bent outwardly. Trucks when formed in this manner are not strong and are often bent out of shape when subjected to the strains encountered through hard usage. Suggestions have been made to reinforce the thin sheet metal by braces or similar strengthening parts, but suggested structures of this character have been both complicated and expensive.

In the truck constructed with the present invention I overcome the disadvantages above noted by forming the truck of rigid articulated parts which may be readily separated to permit the mounting of the car axles in the truck sides and which may be then joined together to form a strong and durable structure. In the preferred embodiment of the invention the parts of the truck are formed of two castings, preferably die castings, which are secured together beneath the car body by the bolt or other connection which normally secures the truck to the bottom of the car. A truck thus formed is simple, economical and exceptionally strong in construction.

Numerous objects and advantages of my invention other than those noted will appear from the following description taken in connection with the accompanying drawing which shows one embodiment of the present invention and wherein:

Figure 1 is a side elevation of a portion of a toy railway car showing a truck located near one end of the car body;

Figure 2 is a top plan view of the truck shown in Figure 1;

Figure 3 is a sectional view taken on the line of 3—3 of Figure 1;

Figure 4 is a sectional view taken on the line 4—4 of Figure 1, and

Figure 5 is an exploded perspective view showing the adjoining portions of the two parts or members forming the truck, together with the means for securing these portions together and for securing the truck to the bottom car body.

Referring to Figure 1 reference character 10 represents a toy car body and 11 one of the trucks employed for supporting the body. Mounted in openings 13 formed in the sides 14 of the truck are the ends of the car axles 15 upon which are mounted the truck wheels 16.

A truck body 11 which is of inverted U-shape comprises two metal members 20 and 21 preferably formed of die castings and each consisting of the vertical side 14 and a substantially horizontal portion indicated in the case of the member 20 by reference character 24 in the case of member 21 by reference character 25. The inner ends of the portions 24 and 25 are stepped so as to form complementary seats 30 and 31 respectively, the seat in each portion being adapted to receive the end of the other portion so as to form a joint between the two portions similar to a rabbet joint. The inner end of the seat on each portion is formed by a shoulder 34 having a central recess 35 adapted to receive projections 36 at the outer end of the other portion. The recesses 35 and projections 36 assist in assembling the members 20 and 21 in alignment with one another and also serve to prevent lateral displacement of the members relative to one another. The inner ends of each member centrally of the seats 30 and 31 are formed with openings 40 adapted to receive a bushing 43 which is internally screw-threaded for the reception of a screw 44 extending downwardly through an opening 45 in the bottom of the car body, the bushing 43 and screw 44 thus serving as a means for joining the members 20 and 21 together and also for pivotally securing the joined members which form the truck to the car body.

The top of member 24 is formed with a boss 50 which surrounds the bushing 43 and forms a bearing upon which the car body is supported and the member 24 is formed at one end with a lug 52 which extends upwardly into an arcuate slot 55 in the bottom of the car body.

The members 20 and 21 may be easily formed by die casting and, if desired, the outer faces of the sides 14 may be given a configuration to represent in appearance trucks in use in modern types of vehicles; thus the outer surface of the side may be cast so as to represent springs 56 and 57. Also, suitable openings 59 may be formed in the sides of 14 so as to receive sheet metal members 60 bent or otherwise formed to represent journal boxes.

I claim:

1. A toy car truck body formed to represent a standard car truck and formed of two die cast metal members removably connected together, each member comprising one side of the truck body.

2. A toy truck comprising two members each forming one side of the truck and each member having an inwardly extending portion, and means for removably securing said portions together at their inner ends, said means also serving to secure the truck to the car body.

3. A toy truck comprising metal members having inwardly extending portions overlapping at their inner ends and means extending through the overlapping ends for securing the said members together and securing the truck to a car body.

4. A toy truck comprising two cast metal members having differently formed inwardly extending portions interfitting at their inner ends and means extending through the interfitting ends for securing said members together.

5. A toy truck comprising two cast metal members having inwardly extending portions overlapping and interfitting at their inner ends and means extending through the overlapped ends for securing said members rigidly together and for pivotally securing the truck to the car body.

6. A toy truck comprising two metal members having inwardly extending portions overlapping at their inner ends, a bushing extending upwardly through said overlapping portions and means adapted to extend downwardly through the bottom of the car body into said bushing for rigidly securing said parts together and for pivotally securing the truck to the bottom of the car body.

7. A toy truck comprising two metal members having inwardly extending portions overlapping at their inner ends, a bushing extending upwardly through said overlapping portions and means adapted to extend downwardly through the bottom of the car body into said bushing for rigidly securing said parts together and for pivotally securing the truck to the bottom of the car body, and one of said members having an upwardly extending boss which forms a bearing adapted to engage the car body.

8. In a toy car the combination with a toy car axle of a truck formed of articulated cast metal members, detachably secured together and comprising side sections, each formed with an opening having integral continuous side walls for retaining said axle, and said axle being insertable into and removable from said openings on detachment and attachment, respectively, of said members.

9. A toy truck comprising a pair of rigid articulated metal members forming the two sides of the truck, each member having an opening for the reception of an end of a car axle, said openings being formed of integral continuous walls and said members being rigidly detachable for insertion in said openings of said axle.

10. A toy truck comprising two rigid metal members having two inwardly extending portions which overlap, one above the other, and means extending through the overlapped portions for detachably securing the members together.

11. A truck for toy cars, comprising two rigid side members formed with inwardly extending, interfitting portions and a single bolt extending through said portions and serving to hold said members rigidly together.

12. A toy truck of inverted U-shape, having means at its centre for pivotally securing the truck to a car body, said truck comprising two overlapping rigid portions, removably and rigidly secured to one another, the separate portions forming opposite sides of the truck and formed with axle receiving openings.

13. A toy truck of inverted U-shape, having means at its centre for pivotally securing the truck to a car body, said truck comprising two overlapping, die cast metal portions, removably and rigidly secured to one another, the separate portions forming opposite sides of the truck and formed with axle receiving openings.

Signed at New York in the county of New York and State of New York, this 19th day of April, A. D. 1928.

JOHN C. KOERBER.